United States Patent [19]
Jackson

[11] 3,826,209
[45] July 30, 1974

[54] LANDSCAPING APPARATUS WITH SEED DISPENSER

[75] Inventor: Carl D. Jackson, Fortville, Ind.

[73] Assignee: C. D. Jackson Manufacturing, Inc., Fortville, Ind.

[22] Filed: Apr. 19, 1972

[21] Appl. No.: 245,315

[52] U.S. Cl.................................. 111/8, 111/10
[51] Int. Cl............................................ A01c 7/08
[58] Field of Search............. 111/85, 10, 8, 64, 77; 172/145, 146, 150, 157, 537, 170, 484

[56] References Cited
UNITED STATES PATENTS

| | | | |
|---|---|---|---|
| 1,301,043 | 4/1919 | Dougherty | 172/537 X |
| 2,657,652 | 11/1953 | Graham | 111/64 |
| 2,965,053 | 12/1960 | Grueber | 111/10 |
| 3,448,814 | 6/1969 | Bentley et al. | 172/146 |
| 3,539,018 | 11/1970 | Sprenkel | 172/484 |
| 3,563,191 | 2/1971 | Yovanovich | 111/10 |
| 3,586,111 | 6/1971 | Jackson | 172/537 X |
| 3,610,185 | 10/1971 | Scarborough | 111/85 X |
| 3,661,213 | 5/1972 | Taylor | 111/10 X |

Primary Examiner—Stephen C. Pellegrino
Attorney, Agent, or Firm—Woodward, Weikart, Emhardt & Naughton

[57] ABSTRACT

An apparatus for landscaping having a container for dispensing seed. The frame of the apparatus has a roller swingably mounted thereto positionable against the ground for rolling the ground after the seed is dispensed. A plurality of plow blades and a rake are mounted to the frame for plowing and raking the ground prior to seed dispensing. The container is removably mounted to the frame and includes a slotted bottom wall through which the seed passes. A pair of shafts are rotatably mounted to the container on either side of the slotted bottom wall to facilitate the dispensing and are geared together with one of the shafts being connected to a sprocket mounted externally to the frame. A ground engaging wheel is connected to the sprocket by a continuous chain so as to drive the sprocket and container shafts as the apparatus is moved across the ground. The sprocket and ground engaging wheels are rotatably mounted on a plate which in turn is mounted to the frame. A flange on the frame together with a removable pin secures the roller in a downward position against the ground and the plate to the frame.

9 Claims, 7 Drawing Figures

PATENTED JUL 30 1974          3,826,209
SHEET 1 OF 3
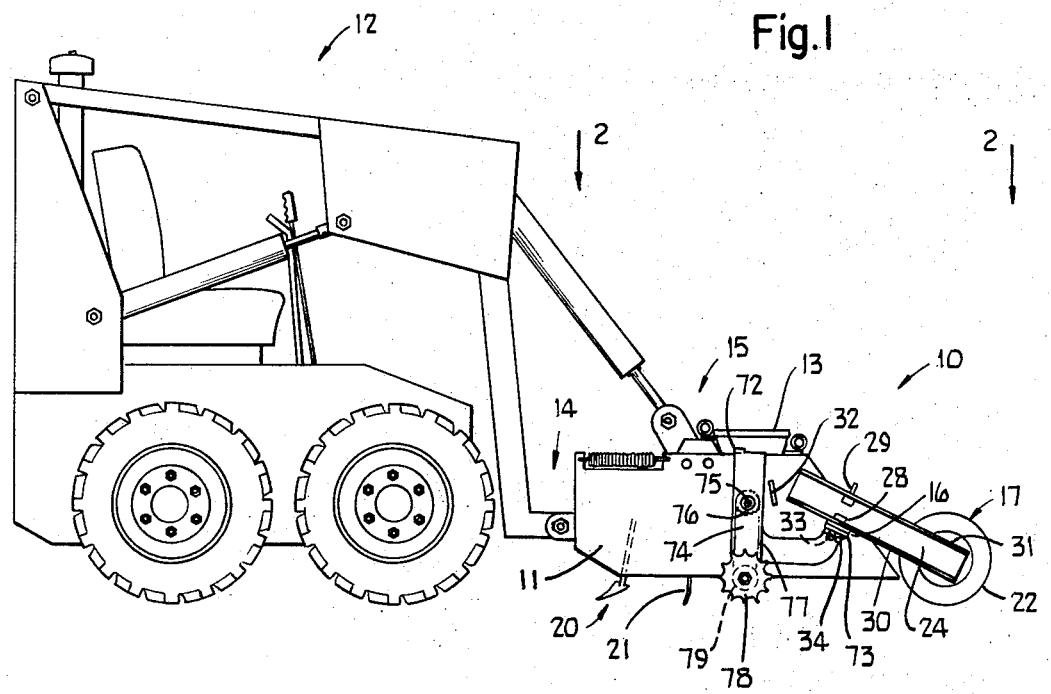
Fig. 1
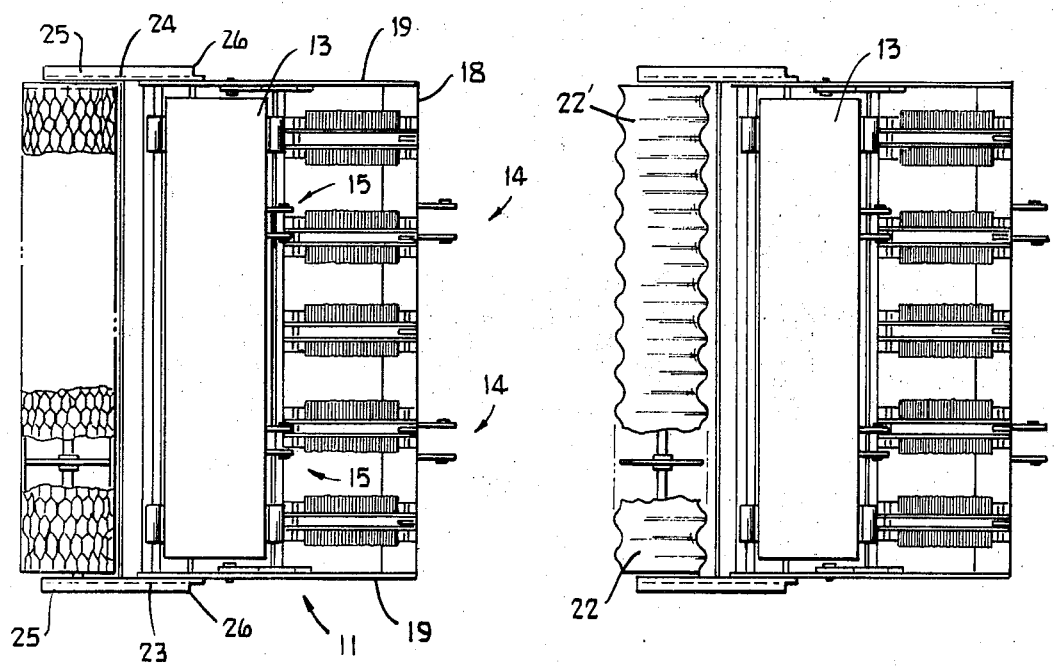
Fig. 2                              Fig. 3

LANDSCAPING APPARATUS WITH SEED DISPENSER

BACKGROUND OF THE INVENTION

1. Field of the Invention

This invention is in the field of landscaping devices.

2. Description of the Prior Art

In the U.S. Pat. No. 68,110 a machine is disclosed for pulverizing the earth prior to planting. A more recent machine for grading the ground and leveling the ground is disclosed in the U.S. Pat. No. 3,448,814 issued to Thomas A. Bentley. An improvement to the Bentley machine is disclosed in my U.S. Pat. No. 3,586,111 wherein the landscaping machine is provided with a notching blade for providing a groove or notch in the sod adjacent a walk or the like. The apparatus disclosed herein, is an improvement over my landscaping apparatus disclosed in the latter patent in that a seed dispenser is removably mounted to the landscaping apparatus for dispensing seed to the ground at a position between the plow blades and the roller. Two other machines which condition the soil and dispense seed are disclosed in the U.S. Pat. Nos.: 2,965,053 issued to J. R. Gruber and 3,083,652 issued to H. J. Brettrager et al. Both the Gruber and Brettrager devices provide a seed dispenser which is operatively driven by the roller which extends across the width of the device. Another dispenser which is drivingly engaged by the main wheel of the device is disclosed in the U.S. Pat. No. 2,730,054 issued to Joseph F. McDonald. Another dispensing apparatus is disclosed in the U.S. Pat. No. 2,733,838 issued to William H. Neff. The dispenser disclosed herein is particularly advantageous in that it is easily removable from the landscaping apparatus and in that it is provided with a separate drive means which engages the ground independently of the main rollers or wheels of the apparatus.

SUMMARY OF THE INVENTION

One embodiment of the present invention is a landscaping apparatus including a frame connectable to a prime mover, a roller mounted to the frame and positionable against the ground for the rolling thereof, a plurality of plow blades mounted to the frame and depending therefrom to engage the ground, a material holding container mounted to the frame having a bottom end located between the roller and the blades with dispensing means mounted thereon for dispensing the material downwardly between the roller and the blades, wherein the improvement comprises: drive means mounted to the frame and connected to the dispensing means, the drive means directly engages the ground independently of the roller and is operable as said apparatus is moved across the ground to drive said dispensing means causing the material to be dispensed from the container.

It is an object of the present invention to provide a new and improved landscaping apparatus.

It is a further object of the present invention to provide a landscaping apparatus which includes a new and improved seed dispenser.

Yet another object of the present invention is to provide a landscaping apparatus which includes a roller positioned and locked against the ground in a relatively easy manner.

Related objects and advantages of the present invention will be apparent from the following description.

BRIEF DESCRIPTION OF THE DRAWING

FIG. 1 is a side view of the landscaping apparatus incorporating the present invention shown attached to a prime mover.

FIG. 2 is a top view rotated 180° of the apparatus of FIG. 1 viewed in the direction of arrows 2—2.

FIG. 3 is the same view as FIG. 2 only showing an alternate embodiment of the roller.

DESCRIPTION OF THE PREFERRED EMBODIMENT

Figure 4:
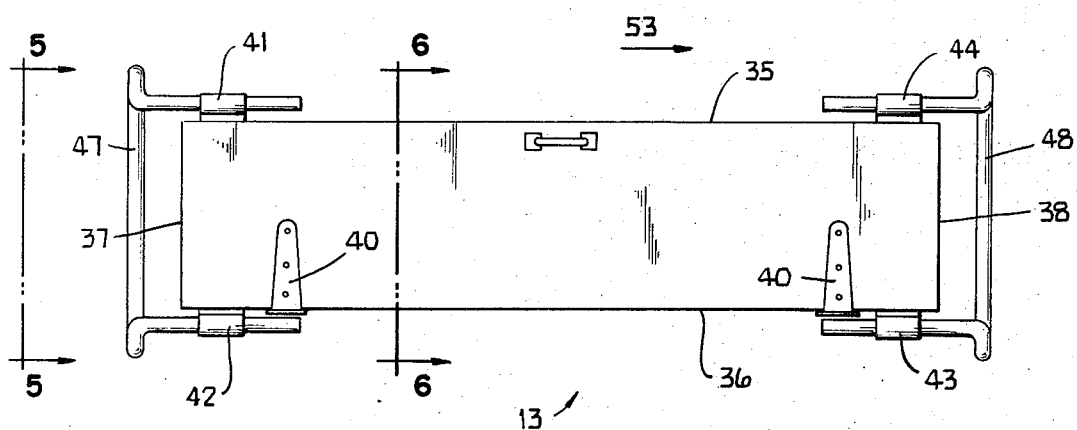
FIG. 4 is an enlarged top view of the seed dispenser shown removed from the apparatus of FIG. 1 and mounted to a stand.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further application of the principles of the invention as illustrated therein being contemplated as would normally occur to one skilled in the art to which the invention relates.

Referring now more particularly to FIG. 1, there is shown a landscaping apparatus 10 which includes a frame 11 connectable to a prime mover 12. Landscaping apparatus 10 is identical with the landscaping apparatus disclosed in my U.S. Patent No. 3,586,111 with the exception that a seed dispenser 13 is provided, different tie brackets 14 and 15 are provided for connecting to mover 12, and a different means 16 is provided for holding roller 17 in the downward position. An alternate embodiment of the roller 17 is also disclosed. U.S. Pat. No. 3,586,111 is hereby incorporated by reference for purposes of disclosing structure of apparatus 10 which is not disclosed herein.

Frame 11 includes a transverse wall 18 and a pair of sides 19. Sides 19 are fixed to transverse wall 18 and project therefrom. Fixed to sides 19 is a cross bar which is shown in FIG. 4 of my U.S. patent incorporated herein by reference. The cross bar has pivotally mounted thereon at equal intervals a plurality of depending plow blades. Each of the plow blades curves downwardly and forwardly and extend beneath the lower surface of the frame. One such plow blade is shown herein as blade 20 (FIG. 1). Another cross member is fixed to sides 19. The second cross member has a plurality of raking tines 21 which are swingably mounted to the cross member. Blades 20 are used to provide the rough cut into the ground with tines 21 smoothing the ground prior to the rolling of the ground by roller 17.

Roller 17 includes an outer wall 22 rotatably mounted to a pair of roller mounting members 23 and 24. The distal ends 25 of members 23 and 24 have the roller rotatably mounted thereto whereas the proximal ends 26 of members 23 and 24 are swingably secured to frame 11. The roller is swingable to a first downward position adjacent the ground shown in FIG. 1 and then to a second upward position resting upon the frame. A pair of flanges 16 are mounted to sidewalls 19 and extend outwardly therefrom being positioned immediately beneath and against members 23 and 24 when roller 17 is in the downward position. One such flange is shown in FIG. 1. Each member 23 and 24 has a C-shaped cross section with a pair of lugs mounted to each member. For example, lugs 28 and 29 are mounted respectively to walls 30 and 31 of member 24. Lug 28 is fixedly secured to wall 30 and is positioned so as to extend through an aperture provided in flange 16. Lug 29 is fixedly secured to wall 31 and extends through an aperture provided in flange 32 when the roller is in the upward position. A similar flange 32 is provided on the opposite sidewall. In one embodiment, the lugs were threaded rods secured to members 23 and 24 having an aperture in their outer extending ends for receiving a removable pin. For example, lug 28 is provided with aperture 33 for receiving pin 34. Thus, to pivot the roller to the upward position, the pins are removed from the lugs extending through flanges 16 with the roller then being pivoted to the upward position and the pins inserted into the apertures of lugs 29. The pins therefore lock the roller in either the upward or downward position.

Figure 5:
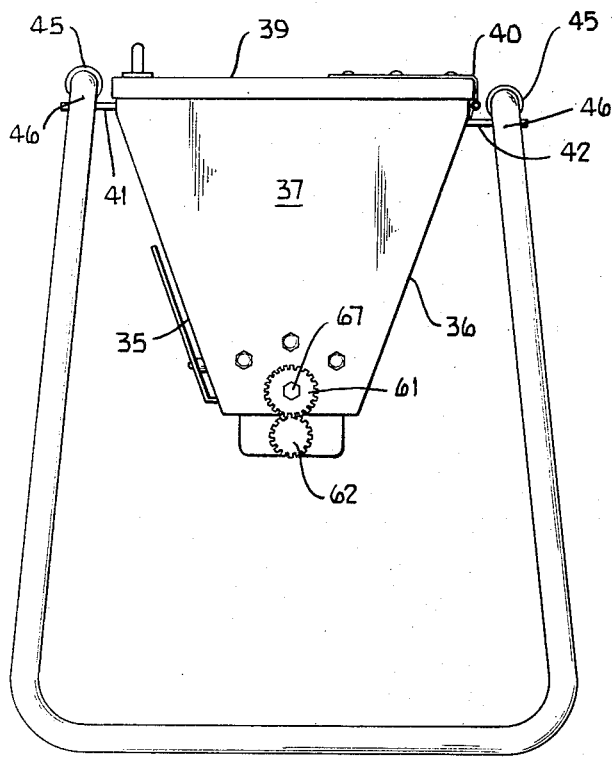
FIG. 5 is an enlarged end view of the seed dispenser looking in the direction of arrows 5—5 of FIG. 4.
Figure 6:
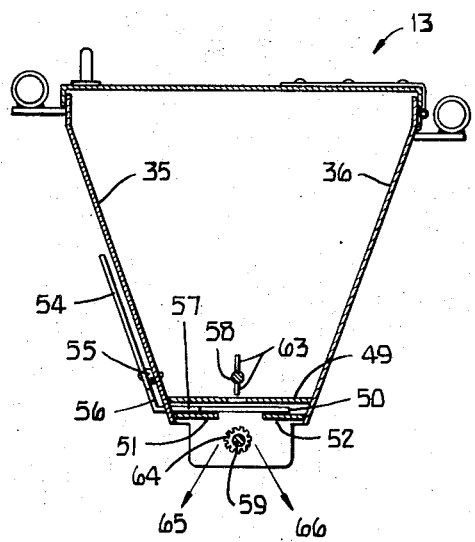
FIG. 6 is an enlarged cross sectional view taken along the line 6—6 of FIG. 4 and viewed in the direction of the arrows.
Figure 7:
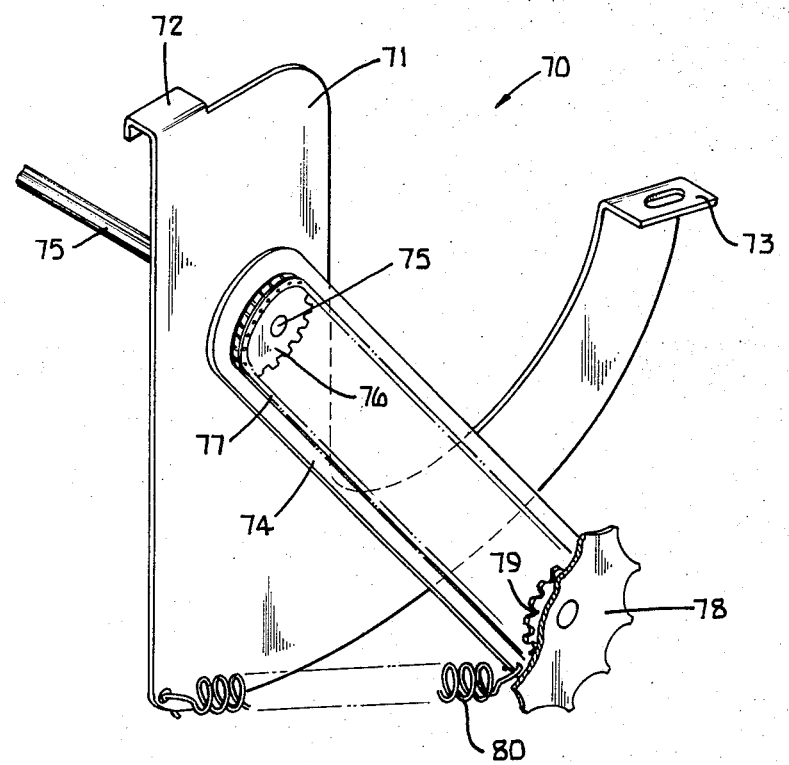
FIG. 7 is an enlarged perspective view of the driving means for the seed dispenser shown apart from the apparatus.

Seed dispenser 13 is shown removed from the apparatus and is positioned on a stand in FIGS. 4 and 5. The seed dispenser has a pair of downwardly converging sidewalls 35 and 36 joined to a pair of end walls 37 and 38. A lid 39 is hingedly mounted atop the dispenser by a standard hinge 40 connected to sidewall 36. Lid 39 may be opened so as to fill the dispenser with seed. A pair of outwardly extending brackets 41 and 42 are respectively mounted to sidewalls 35 and 36 near the top end of the dispenser. Two additional brackets 43 and 44 identical to brackets 42 and 41 are mounted respectively to sidewalls 36 and 35 adjacent the lid and end wall 38. Each bracket includes a hollow sleeve 45 fixedly mounted thereatop. The sleeves have an inside diameter to slidably receive the top ends 46 of a pair of U-shaped stands 47 and 48. To mount the dispenser to the landscaping apparatus, stands 47 and 48 are pulled away from the dispenser so as to disengage the sleeves.

Dispenser 13 includes a bottom wall 49 which is connected to the end walls and sidewalls of the dispenser. Wall 29 is provided with a plurality of apertures through which the seed may fall. A movable plate 50 is slidably mounted beneath wall 49 atop plates 51 and 52 which are mounted to sidewalls 35 and 36 by fastening means such as by spot welding. Wall 50 is movable in a direction towards or opposite arrow 53 by a lever 54 mounted externally to side wall 35. Lever 54 is pivotally mounted by pin 55 and has a lower end 56 connected to plate 50 by linkage 57. Plate 50 is provided with a plurality of slots which are aligned with the holes in wall 49 when lever 54 is positioned at one extreme. By pivoting the lever in the opposite direction, the amount of seed passable from the dispenser is controlled since the slots in plate 50 are moved with respect to the holes in wall 49 and aligned with the solid portion of wall 49 so as to minimize or prevent the seed from falling from the dispenser.

A pair of rods 58 and 59 are rotatably mounted to the end walls of the dispensers. Rods 58 and 59 extend through end wall 37 and have gears 61 and 62 respectively mounted thereto. Gears 61 and 62 intermesh so that rotation of one rod will result in the rotation of the other rod. Rod 58 is positioned above wall 49 and plate 50 whereas rod 59 is positioned beneath the wall and plate. A plurality of small plates 63 are mounted along the length of rod 58 perpendicular to the longitudinal axis of the rod. Likewise, a plurality of small wheels 64 are mounted along the length of rod 59. Each wheel 64 has a serrated circumferential edge positioned immediately beneath the openings through wall 49 and plate 50 through which the seed passes. Thus, as the rods are rotated, plates 63 move about the longitudinal axis of rod 58 preventing the seed from becoming jammed in the dispenser. As the seed falls through the opening, some of the seed falls on wheels 64 therefore causing the seed to fall in the direction of arrows 65 and 66 in lieu of straight down to provide an even seed distribution. Shaft 58 includes a hexagonally shaped hole 67 which is positioned adjacent sidewall 19 of frame 11 to receive a rod extending therein from the drive means.

Drive means 70 includes a first plate 71 having a top bracket 72 positioned over and against the top edge of frame 11. The bottom of plate 71 includes a flange 73 which is positioned against flange 16 of frame 11 with lug 28 passing through both flange 16 and 73. The removable pin is inserted through hole 33 of lug 29 so as to position flanges 73 and 16 between the pin and member 24 thereby rigidly locking the drive means and roller member to the frame. A second plate 74 is pivotally mounted by rod 75 to plate 71. Rod 75 has a hexagonally shaped cross section and extends through an aperture provided in frame 11 and into hole 67 of shaft 58. Sprocket 76 is fixedly mounted onto rod 75 and is in meshing engagement with a chain 77. A ground engaging wheel 78 is rotatably mounted to the bottom end of plate 74. In addition, a second gear 79 is rotatably mounted to the bottom end of plate 74 and is secured between plate 74 and sprocket 78. Gear 79 is fastened to wheel 78 so as to prevent relative motion therebetween with gear 79 in meshing engagement with chain 77. As a result, as the apparatus is moved across the ground, wheel 78 will rotate causing chain 77 to rotate sprocket 76 and rod 75 thereby driving shafts 58 and 59 of the dispenser. A helical spring 80 has its opposite end secured to plates 71 and 74 so as to normally urge wheel 78 into the ground and towards the plow blades. To remove the drive means 70 from the apparatus, pin 34 is removed from lug 28 and rod 75 is pulled outwardly with respect to the frame. The drive means may then be lifted from the apparatus along with the seed dispenser.

Frame 11 has an open top and an open bottom so as to allow seed dispenser 13 to be dropped through the top end with the seeds falling through the bottom end. Brackets 42 and 43 act as stops against the top edge of the frame. Likewise, brackets 41 and 44 act as stops which contact a horizontal beam upon which tie brackets 15 are mounted. The horizontally extending beam is mounted to the top of frame 11. Each tie bracket has a pair of spaced apart mounting walls which receive a downwardly extending piston rod of a piston mounted to prime mover 12. Prime mover 12 is positioned on the side adjacent plow blades 20 and is farthest from roller 17. Such a prime mover may be the Owatana Mustang tractor. Tie brackets 14 mounted to frame 11 connect to the lower frame of mover 12. By extending the piston rods of the prime mover, roller 17 may be forced downwardly harder against the ground with the weight of the apparatus 10 being supported on the roller. By retracting the piston rods, frame 11 may be tilted so as to allow only the plow blades 20 to engage the ground. The roller has an outer wall 22 which is provided with a foraminous tread with the openings therein being of such size as to permit entrance into and discharging of soil. An alternate embodiment of the roller is shown in FIG. 3 with the only exception being the outer wall 22 being solid and impervious and having a plurality of ridges 22' extending circumferentially therearound. The outer wall of the roller shown in FIG. 3 resembles a drainage pipe.

It will be obvious from the above description that the present invention provides a landscaping apparatus which has a material dispensing container with a lower end positioned between the plow blades and roller of the apparatus. As a result, the apparatus may be utilized simultaneously to plow, dispense seed and then roll the ground. The drive means for the dispensing means directly engages the ground independently of the roller and is operable to drive the dispensing means causing material to be dispensed from the container as the apparatus is moved across the ground.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. In a landscaping apparatus including a frame connectable to a prime mover, a roller mounted to said frame and positionable against the ground for the rolling thereof, a plurality of plow blades mounted to said frame and depending therefrom to engage the ground, a material holding container mounted to said frame having a bottom end located between said roller and said blades with dispensing means mounted thereon for dispensing said material downwardly between said roller and said blades wherein the improvement comprises:

drive means mounted to said frame and connected to said dispensing means, said drive means directly engages the ground independently of said roller and is operable as said apparatus is moved across the ground to drive said dispensing means causing said material to be dispensed from said container; and wherein:

said frame has a top and bottom with a passage extending therebetween for removably receiving said container which includes stops abuttable against said frame for the holding of said container;

said drive means includes a first plate mounted to said frame, a toothed wheel rotatably mounted to said plate and operatively connected to said dispensing means, a ground engaging wheel rotatably mounted and connected to said plate and operatively connected to said toothed wheel, said dispensing means includes a rotatably mounted driving rod with a socket provided adjacent an end of said driving rod, said toothed wheel includes another rod removably projecting into said socket.

2. In a landscaping apparatus including a frame connectable to a prime mover, a roller mounted to said frame and positionable against the ground for the rolling thereof, a plurality of plow blades mounted to said frame and depending therefrom to engage the ground, a material holding container mounted to said frame having a bottomend located between said roller and said blades with dispensing means mounted thereon for dispensing said material downwardly between said roller and said blades wherein the improvement comprises:

drive means mounted to said frame and connected to said dispensing means, said drive means directly engages the ground independently of said roller and is operable as said apparatus is moved across the ground to drive said dispensing means causing said material to be dispensed from said container; and wherein:

said frame has a top and bottom with a passage extending therebetween for removably receiving said container which includes stops abuttable against said frame for the holding of said container;

said drive means includes a first plate mounted to said frame, a toothed wheel rotatably mounted to said plate and operatively connected to said dispensing means, a ground engaging wheel rotatably mounted and connected to said plate and operatively connected to said toothed wheel; and further comprising:

a pair of roller mounting members rotatably mounting said roller at distal ends of said roller mounting members and swingably secured to said frame at the proximal ends of said roller mounting members, said roller being swingable to a first downward position adjacent the ground and a second upward position resting upon said frame wherein the improvement further comprises:

a flange having an aperture, said flange mounted to said frame adjacent one of said members in said downward position, a lug mounted to said one member and extending through said aperture of said flange when said one member is in said downward position, a locking element removably mountable to said lug with said flange positioned between said lug and said one member to hold said roller downwardly when in said first position so that a portion of the weight of said frame may be supported on said roller.

3. In the landscaping apparatus of claim 2 wherein:

said plate includes a portion positionable against said flange with said portion and said flange being positionable between said locking element and said one member to secure said plate, said flange, and said one member together.

4. In the landscaping apparatus of claim 3 wherein:

said plate includes a top bracket engageable with said frame, said drive means includes a second plate pivotally mounted to said first plate, a rod rotatably mounted to said first plate and said second plate and upon which said toothed wheel is mounted, said rod extends into said container and is drivingly engaged with said dispensing means, said second plate includes a lower end upon which said ground engaging wheel is mounted, and a spring having opposite ends connected to said first plate and said second plate urging said ground engaging wheel into the ground.

5. In the apparatus of claim 4 wherein the container includes:

a slotted bottom wall, a first shaft rotatably mounted within said container above said slotted wall, a second shaft rotatably mounted on said container below said slotted wall, a first gear mounted to an end of said first shaft, a second gear mounted to an end of said second shaft and in meshing engagement with said first gear, said first shaft and said rod are connected together so rotation of said ground engaging wheel causes rotation of said first shaft and said second shaft.

6. In the apparatus of claim 5 wherein:

said stops on said container include outwardly projecting flanges mounted on opposite sidewalls of said container and having two tubes fixed thereon to receive rod-like arms of a stand when said container is not mounted to said frame.

7. In a landscaping apparatus including a frame connectable to a prime mover, a roller mounted to said frame and positionable against the ground for the rolling thereof, a plurality of plow blades mounted to said frame and depending therefrom to engage the ground, a material holding container mounted to said frame having a bottom end located between said roller and said blades with dispensing means mounted thereon for dispensing said material downwardly between said roller and said blades wherein the improvement comprises:

drive means mounted to said frame and connected to said dispensing means, said drive means directly engages the ground independently of said roller and is operable as said apparatus is moved across the ground to drive said dispensing means causing said material to be dispensed from said container;

a pair of roller mounting members rotatably mounting said roller at distal ends of said roller mounting members and swingably secured to said frame at the proximal ends of said roller mounting members, said roller being swingable to a first downward position adjacent the ground and a second upward position resting upon said frame wherein the improvement further comprises:

a flange having an aperture, said flange mounted to said frame adjacent one of said members in said downward position, a lug mounted to said one member and extending through said aperture of said flange when said one member is in said downward position, a locking element removably mountable to said lug with said flange positioned between said lug and said one member to hold said roller downwardly when in said first position so that a portion of the weight of said frame may be supported on said roller.

8. In the landscaping apparatus of claim 7 wherein:

said drive means includes a plate, said plate includes a portion positionable against said flange with said portion and said flange being positionable between said locking element and said one member to secure said plate, said flange, and said one member together.

9. In a landscaping apparatus including a frame connectable to a prime mover, a roller mounted to said frame and positionable against the ground for the rolling thereof, a plurality of plow blades mounted to said frame and depending therefrom to engage the ground, a material holding container mounted to said frame having a bottom end located between said roller and said blades with dispensing means mounted thereon for dispensing said material downwardly between said roller and said blades wherein the improvement comprises:

drive means mounted to said frame and connected to said dispensing means, said drive means directly engages the ground independently of said roller and is operable as said apparatus is moved across the ground to drive said dispensing means causing said material to be dispensed from said container; and wherein:

said frame has a top and bottom with a passage extending therebetween for removably receiving said container which includes stops abuttable against said frame for the holding of said container;

said stops on said container include outwardly projecting flanges mounted on opposite sidewalls of said container and having two tubes fixed thereon to receive rod-like arms of a stand when said container is not mounted to said frame.

* * * * *